United States Patent [19]
Kimura et al.

[11] Patent Number: 5,833,728
[45] Date of Patent: *Nov. 10, 1998

[54] METHOD FOR THE PREPARATION OF VITREOUS HOLLOW MICROSPHERES

[75] Inventors: Kunio Kimura; Hiroyuki Nakamura, both of Tosu; Yukiyoshi Tamoto, Ichihara; Junichi Kimoto; Hiromi Okada, both of Mine, all of Japan

[73] Assignee: Agency of Industrial Science and Technology, Japan

[*] Notice: The term of this patent shall not extend beyond the expiration date of Pat. No. 5,614,255.

[21] Appl. No.: 826,337

[22] Filed: Mar. 27, 1997

[30] Foreign Application Priority Data

Mar. 27, 1996 [JP] Japan ................................ 8-072442

[51] Int. Cl.$^6$ ............................ C03B 9/00; C03B 19/10; C03B 23/00; C03B 37/00

[52] U.S. Cl. ........................ 65/21.3; 65/21.4; 427/212; 427/215; 427/372.2; 501/80; 501/84; 501/85; 106/605

[58] Field of Search ................... 65/21.31, 21.4, 65/30.12, 31; 501/80, 84, 85; 427/212, 215, 372.2; 106/605

[56] References Cited

U.S. PATENT DOCUMENTS

| | | | |
|---|---|---|---|
| 3,904,377 | 9/1975 | Honda et al. | 29/180 |
| 3,957,501 | 5/1976 | Matsuda et al. | 106/75 |
| 4,390,456 | 6/1983 | Sanchez et al. | 252/448 |
| 4,543,137 | 9/1985 | Edamura et al. | 149/21 |
| 5,017,523 | 5/1991 | Kimura et al. | 501/85 |
| 5,614,255 | 3/1997 | Kimura et al. | 427/212 |

FOREIGN PATENT DOCUMENTS 8208272  8/1996  Japan ................................ 427/212

*Primary Examiner*—Peter Chin
*Assistant Examiner*—Jacqueline A. Ruller
*Attorney, Agent, or Firm*—Wenderoth, Lind & Ponack

[57] ABSTRACT

Provided is a method for the efficient preparation of fine hollow spherical glassy bodies having a high strength and excellent whiteness from a volcanic vitreous deposit as the starting material. The fine hollow spherical glassy bodies as desired can be prepared by dispersing 100 parts by weight of a powder of a volcanic vitreous deposit in an aqueous solution containing 1 to 10 parts by weight of aluminum sulfate, adding an aqueous alkaline solution to this liquid suspension to cause deposition of an alumina hydrate onto the surface of the particles of said powder and washing and drying of the solid material followed by a heat treatment for 1 second to 1 minute at a temperature of 900° to 1100° C.

4 Claims, No Drawings

METHOD FOR THE PREPARATION OF VITREOUS HOLLOW MICROSPHERES

BACKGROUND OF THE INVENTION

The present invention relates to an improvement of the method for the preparation of fine hollow spherical glassy bodies from a volcanic vitreous deposit as a starting material. To say more particularly, the present invention relates to an efficient method for the preparation of fine hollow spherical glassy bodies having a high strength and excellent whiteness.

Having a low specific gravity and excellent heat resistance, fine hollow spherical glassy bodies are highlighted as a light-weight filler for various kinds of metals, ceramics, concretes, plastics and the like and the demand therefor is rapidly growing in recent years.

The method known heretofore for the preparation of fine hollow spherical glassy bodies from a volcanic vitreous deposit as a starting material includes the method in which fine particles of "shirasu" are calcined for 10 seconds to 10 minutes at a temperature of 800° to 1200° C. followed by elutriation for specific gravity in water or air-flotation classification to prepare fine hollow spherical glassy bodies (official publication of Japanese Patent Publication No. 48-17645). In this method, however, fine hollow spherical glassy bodies as desired cannot be obtained even by processing of a volcanic vitreous deposit having a particle diameter not exceeding 20 µm.

On the other hand, a method is known for the preparation of ultrafine spherical glassy bodies by undertaking a heating treatment by the use of an acid solution as a pre-treatment of the starting material (specification of U.S. Pat. No. 5,017, 523). This method, however, has defects that it is necessary to use an acid-resistant, pressure-resistant treatment vessel in order to promote a hydrothermal reaction at 100° C. or higher with an inconvenience relative to the facilities and, besides, the efficiency of the treatment is extremely low along with a difficulty in conducting uniform expansion by heating in a conventional heating expansion apparatus due to agglomeration of the particles because the starting material consists of fine particles.

The inventors previously developed a method for the preparation of ultrafine hollow spherical glassy bodies by conducting a heating treatment by the use of aluminum sulfate and urea as a pre-treatment of the starting material (Japanese Patent Kokai No. 8-208272). This method, however, has defects that heating to 70° C. or higher is required and urea must be used in an excess amount to cause inconvenience relative to the facilities along with the necessity that the waste liquid containing unreacted urea is disposed, and so on.

SUMMARY OF THE INVENTION

The present invention has been completed with an object, by overcoming the above described defects in the prior art preparation methods for fine hollow spherical glassy bodies, to provide a method for the efficient preparation of fine hollow spherical glassy bodies having a high strength and excellent whiteness without causing agglomeration of the particles in the course of the heating expansion from a volcanic vitreous deposit as the starting material by using a simple apparatus and without necessitating disposal of waste liquid.

The inventors have continued extensive investigations on the method for the preparation of fine hollow spherical glassy bodies from a volcanic vitreous deposit and, as a result, have arrived at a discovery that, when, in conducting a heating expansion treatment of a powder of a volcanic vitreous deposit, the particles of said powder are coated in advance with an alumina hydrate, the water in the particles can be retained to cause efficient expansion and there an aluminum oxide film is formed on the surface of the particles so that the particles are prevented from melt-coalescence to accomplish the above mentioned object leading to completion of the present invention on the base of this discovery.

Namely, the present invention provides a method for the preparation of fine hollow spherical glassy bodies characterized in that 100 parts by weight of a powder of a volcanic vitreous deposit are uniformly dispersed in an aqueous solution containing from 1 to 10 parts by weight of aluminum sulfate followed by the addition of an aqueous alkaline solution to this liquid suspension so as to deposit an aluminum hydrate onto the surface of the particles of said powder and then the solid material is taken out, washed and dried followed by a heat treatment for 1 second to 1 minute at a temperature of 900° to 1100° C.

DETAILED DESCRIPTION OF THE PREFERRED EMBODIMENTS

The volcanic vitreous deposit used as the starting material in the method of the present invention is a naturally occurring mineral such as "shirasu", obsidian, pearlite, pitchstone and the like and it is constituted usually from $SiO_2$, $Al_2O_3$, $Fe_2O_3$, CaO, MgO, $Na_2O$ and $K_2O$ and contains from 3 to 10% by weight of water.

In the method of the present invention, these volcanic vitreous deposits are pulverized and the pulverized material is subjected to particle size classification by dry process classification or wet process classification to use the fraction usually having a particle diameter not exceeding 20 µm.

In the method of the present invention, in the first place, 100 parts by weight of such a powder of the volcanic vitreous deposit are uniformly dispersed in an aqueous solution containing from 1 to 10 parts by weight of aluminum sulfate to prepare a liquid suspension. When the amount of aluminum sulfate is smaller than 1 part by weight, the advantage of the present invention cannot be fully exhibited while, even when it exceeds 10 parts by weight, no further improvement of the effect can be expected for the amount thereof. A preferable amount of aluminum sulfate in respect of effectiveness is in the range from 2 to 8 parts by weight. The concentration of aluminum sulfate in the aluminum sulfate-containing aqueous solution is preferably at least 0.001 mole/liter or, more preferably, in the range from 0.003 to 0.1 mole/liter.

In the next place, the liquid suspension obtained in this manner is gradually admixed with an aqueous alkaline solution so that the aluminum sulfate is hydrolyzed to deposit an alumina hydrate onto the surface of the powder particles. The aqueous alkaline solution is exemplified, for example, by ammonia water and aqueous solutions of sodium hydroxide, potassium hydroxide, lithium hydroxide, hydrogencarbonates such as sodium hydrogencarbonate, potassium hydrogencarbonate, lithium hydrogencarbonate, ammonium hydrogencarbonate and the like, and others. Although they can be used either singly or as a combination of two kinds or more, preferable among them are ammonium hydrogencarbonate and sodium hydrogencarbonate in respect of easy handling and high yield. The concentration of the aqueous alkaline solution is preferably 2 moles/liter or lower or, more preferably, in the range from 0.5 to 1.5 moles/liter. It is advantageous to select the amount of addition of this aqueous alkaline solution such that the amount of the hydrogencarbonate is from 0.8 to 1.2 times equivalent relative to the aluminum sulfate in the liquid suspension. The temperature of the liquid suspension in the course of addition of the aqueous hydrogencarbonate solution usually can well be room temperature but it is optional to heat adequately, if necessary.

In this way, the surface of the powder particles of the volcanic vitreous deposit is coated with an alumina hydrate so as to ensure retention of water inside.

In the next place, the solid material in the liquid suspension is taken out by a known method such as filtration, centrifugal separation, decantation and the like followed by thorough washing by means of water washing and the like followed by a drying treatment and then this dried powder is subjected to a heating treatment for 1 second to 1 minute at a temperature in the range from 900° to 1100° C. to effect expansion. This heating treatment has an effect of coating the surface of the expanded particles with alumina so that melt-coalescence of particles can be efficiently prevented. When the temperature of the heating treatment is lower than 900° C., no full expansion can eventually be accomplished while, in excess of 1100° C., melt-coalescence of the particles may be caused. And, when the heating treatment time is shorter than 1 second, no full expansion can eventually be accomplished while, when longer than 1 minute, no further expansion can proceed rather resulting in an undesirable situation of melt-coalescence of the particles and the like.

The material after heating expansion in this manner, which consists of light-weight hollow bodies, can optionally be subjected to fractionation by specific gravity, such as sink float separation in water or air classification to collect hollow bodies of a still lighter weight.

According to this method, it is possible to obtain fine hollow spherical glassy bodies having a particle diameter not exceeding 20 μm and a particle density not exceeding 1 g/cm$^3$ in a high recovery yield of at least 50% based on the amount of the starting material.

According to the present invention, fine hollow spherical glassy bodies of a high strength and excellent whiteness can be prepared with high efficiency without agglomeration of the particles in the course of heating expansion by the use of a volcanic vitreous deposit as the starting material and without necessitating special apparatuses or waste liquid disposal.

The fine hollow spherical glassy bodies obtained by the method of the present invention are useful as a light-weight filler in various kinds of metals, ceramics, concretes, plastics and the like.

EXAMPLES

In the following, the present invention is described in more detail by way of examples but the present invention is never limited by these examples.

Incidentally, the whiteness and strength of the fine hollow spherical glassy bodies were measured by the following methods.

1. Whiteness

The color difference from the standard white board was determined in the proximity of the apex in the color specification system according to the Lab method and the whiteness (W) was calculated from the following equation:

$$W=100-[(100-L)^2+a^2+b^2]^{1/2},$$

in which L is the luminosity of color, a is, when positive, the degree of redness or, when negative, degree of greenness and b is, when positive, the degree of yellowness or, when negative, degree of blueness.

2. Strength

The sample $S_1$ (g) is added to a mesh screen sample holder and this sample holder is mounted in a pressurizable vessel of which the pressure is increased up to 8 MPa and then the sample holder is taken out. In the next place, the sample is introduced into a sink float separator to be classified into the floating fraction and sinking fraction and the floating fraction is subjected to filtration under suction using a crucible-formed filter followed by drying to determine the weight $S_2$ (g) and the hydrostatic floating rate (H) calculated according to the following equation is recorded to represent the strength:

$$H(\%)=(S_2/S_1)\times 100.$$

Example 1

A powdery starting material was prepared by disintegrating a volcanic vitreous deposit having a composition shown in Table 1 (occurring in Iizaka-cho, Fukushima-shi, Fukushima Prefecture, trivial name Fukushima clay).

TABLE 1

| Composition | | |
|---|---|---|
| Composition of Fukushima clay (% by weight) | $SiO_2$ | 74.84 |
| | $TiO_2$ | 0.07 |
| | $Al_2O_3$ | 10.74 |
| | $Fe_2O_3$ | 1.55 |
| | MgO | 0.21 |
| | CaO | 0.94 |
| | $Na_2O$ | 3.18 |
| | $K_2O$ | 2.99 |
| | Loss on ignition | 5.74 |
| | Total | 100.26 |

Using a 0.2% by weight aqueous solution of water glass (JIS #3) as a liquid medium, the above mentioned powdery starting material was put thereinto and subjected to particle size classification by water elutriation utilizing the difference in the sedimentation rate of particles in water with 5 μm and 10 μm as the classification particle sizes. The proportion of the particles contained in the thus classified particles having a particle diameter larger than 10 μm did not exceed 10% by weight in each case and the proportion of the particles having a particle diameter smaller than 5 μm did not exceed 10% by weight in each case.

In the next place, 100 parts by weight of the powder after particle size classification were added to 160 parts by weight of an aqueous solution of aluminum sulfate in a concentration of 0.05 mole/liter (proportion of aluminum sulfate to the powder: about 3.5 parts by weight) and, under agitation at room temperature, an aqueous solution of ammonium hydrogencarbonate in a concentration of 1 mole/liter was added dropwise over 2 hours in such a volume for equivalency as to hydrolyze the whole amount of the aluminum sulfate. After 2 hours from completion of the dropwise addition, the solid material after the coating treatment was collected by filtration followed by washing with water and drying.

The thus dried powder was fed to a heating expansion apparatus of which the highest temperature was 1040° C. to effect expansion followed by recovery and measurement of the particle density of the recovered material.

Thereafter, sink float separation was undertaken to recover fine hollow spherical glassy bodies as the floating fraction. The recovery yield of the thus obtained fine hollow spherical glassy bodies was calculated. The results are shown in Table 2.

Examples 2 and 3

The volcanic vitreous deposit powder was processed in the same manner as in Example 1 excepting for the use of, in place of the aqueous solution of ammonium hydrogencarbonate used in Example 1 as the aqueous alkaline solution, an aqueous solution of sodium hydroxide or ammonia water. The dry powder obtained in this manner was subjected to heating expansion at a maximum temperature of 1040° C. The particle density and the recovery yield of the thus obtained fine hollow spherical glassy bodies are shown in Table 2.

Comparative Example

Practice was made in the same manner as in Example 1 excepting for omission of the coating treatment in Example 1 for the particle-size classified powder of the volcanic vitreous deposit. However, no continuous treatment could be performed due to fuse-adhesion of a large amount of the particle-size classified powder of the volcanic vitreous deposit inside of the heating expansion apparatus. Continuous treatment could only be performed by modifying the maximum temperature to 1000° C. The results are shown in Table 2.

TABLE 2

| Example | Kind of aqueous alkaline solution | Temperature of heating expansion (°C.) | Vitreous hollow microspheres | |
|---|---|---|---|---|
| | | | Particle density (g/cm³) | Recovery yield (% by weight) |
| Example | | | | |
| 1 | Ammonium hydrogencarbonate | 1040 | 0.80 | 61.2 |
| 2 | Sodium hydroxide | 1040 | 0.88 | 55.2 |
| 3 | Ammonia water | 1040 | 0.88 | 55.2 |
| Comparative example | — | 1000 | 1.36 | 24.4 |

As is understood from Table 2, the particle density is small and the recovery yield of the fine hollow spherical glassy bodies was twice or larger in Example 1 as compared with the Comparative Example. Incidentally, the particle density before heating expansion was 2.30 g/cm³ in both cases.

Example 4

Practice was made in the same manner as in Example 1 excepting for the use of, in place of the aqueous solution of ammonium hydrogencarbonate in Example 1, an aqueous solution of sodium hydrogencarbonate in a concentration of 1 mole/liter. The recovery yield of the thus obtained fine hollow spherical glassy bodies was calculated along with measurement of the whiteness and strength thereof. The results are shown in Table 3.

TABLE 3

| Temperature of heating expansion | Vitreous hollow microspheres | | | |
|---|---|---|---|---|
| | Particle densitiy (g/cm³) | Recovery yield (% by weight) | Whiteness | Strength [H] (%) |
| 1040 | 0.81 | 59.3 | 88.7 | 98.2 |

As is understood from Table 3, the hollow spherical glassy bodies obtained by the method of the present invention were fine particles having high whiteness and large strength.

What is claimed is:

1. A method for the preparation of fine hollow spherical glassy bodies which comprises:

a) uniformly dispersing 100 parts by weight of a powder of a volcanic vitreous deposit in an aqueous solution containing from 1 to 10 parts by weight of aluminum sulfate to form a liquid suspension, b) then adding an aqueous alkaline solution to this liquid suspension to cause deposition of an alumina hydrate onto the surface of the particles of said powder, c) then recovering and washing and drying the solid material recovered followed by d) heat treating the material of c) for 1 second to 1 minute at a temperature of 900° to 1100° C.

2. The method for the preparation described in claim 1 in which the aqueous alkaline solution is an aqueous solution of a hydrogencarbonate.

3. The method for the preparation described in claim 2 in which the aqueous solution of a hydrogencarbonate is an aqueous solution of ammonium hydrogencarbonate or an aqueous solution of sodium hydrogencarbonate.

4. The method for the preparation described in claim 1 in which the concentration of aluminum sulfate in the aluminum sulfate-containing aqueous solution is at least 0.001 mole/liter.

* * * * *